No. 748,511.

Patented December 29, 1903.

UNITED STATES PATENT OFFICE.

OSCAR LIEBREICH, OF BERLIN, GERMANY.

FAT-LIKE SUBSTANCE AND PROCESS OF MAKING SAME.

SPECIFICATION forming part of Letters Patent No. 748,511, dated December 29, 1903.

Original application filed June 7, 1901, Serial No. 63,637. Divided and application filed June 12, 1903, Serial No. 161,230. Again divided and this application filed July 25, 1903. Serial No. 166,969. (No specimens.)

*To all whom it may concern:*

Be it known that I, OSCAR LIEBREICH, a citizen of the German Empire, residing at Berlin, Germany, having invented a new and useful Improvement in and Relating to Fat-Like Substances and Processes of Making Same, of which the following is a specification.

This application is a division of my application, filed June 7, 1901, Serial No. 63,637, and of my application, Serial No. 161,230, filed June 12, 1903.

This invention relates to a new product containing fat-like substances of mineral origin in admixture with such acidulated derivatives of aromatic bases the acid radicals of which belong to the higher fatty acids—that is to say, to fatty acids with more than ten atoms of carbon in one molecule—and the process of making the same. The acidulated derivatives of aromatic bases referred to are formed in a known manner by the reaction on fatty acids (or glycerides of same or compounds) of (1) anilin, (2) bases of the naphthalene series, (3) aromatic diamins, (4) monoalkoyl derivatives of the bases named in Nos. 1 to 3, (5) homologues of the bases named in Nos. 1 to 3 and of the monoalkoyl derivatives of same. The said mixtures of fat-like substances of mineral origin and of the said acidulated derivatives of aromatic bases show substantially all those properties of the fat-like substances—such as paraffin, vaseline, ceresine, petroleum and its components, ozocerite and compounds fit for the manufacture of unguents, hydrophile salves—that is to say, salves which have the property of absorbing water, wax-colors, candles, and other articles; but besides these properties the mixtures have a higher melting-point, and some of them are more capable of absorbing water than the said fat-like substances alone. Therefore these new fat-like substances form a good raw material for the manufacture of unguents, hydrophile salves, candles, wax-colors, &c.

The said mixture of fat-like substances and of acidulated derivatives of aromatic bases may be obtained by melting the components together in suitable proportions.

The following examples show the changes the fat-like substances undergo when same are mixed with the said acidulated derivatives of aromatic bases.

1. Paraffin with melting-point 40° to 42° is raised by an admixture of ten per cent. anilid of stearic acid (melting-point 82°) to a melting-point of 68°.

2. Vaseline, which is clearly melted at 29°, melts after admixture of twenty per cent. anilid of stearic acid at 76° after an admixture of ten per cent. of the same anilid at 70°.

3. Seventy parts of paraffin (melting-point 40° to 42°) and thirty parts of metaphenylendiamid of stearic acid are melted together. The product has a melting-point of 104°.

Other substances may be added to the said mixture of fat-like substances and of acidulated derivatives of aromatic bases without departing from the spirit of my invention. Especially I may add substances of such kind as are adapted to assist the application of the product. I may add, for instance, to mixtures which are to be used for the manufacture of candles, fatty acid compounds and odorous substances, or to mixtures for salves I may add healing or sterilizing or other substances.

Having now fully described my invention, what I claim is—

1. The process of making improved fat-like substances, which consists in mixing an acidulated derivative of an aromatic base in which the acid radical contains more than ten atoms of carbon, with a fat-like substance of mineral origin, for substantially the purposes set forth.

2. The process of making improved fat-like substances, which consists in mixing an acidulated derivative of an aromatic base in which the acid radical contains more than ten atoms of carbon, with paraffin, for substantially the purposes set forth.

3. As a new product improved fat-like substances containing fat-like substances of mineral origin in admixture with such acidulated derivatives of aromatic bases, the acid radicals of which belong to the higher fatty acids that is to say to fatty acids with more than ten atoms of carbon in one molecule substantially as set forth.

4. As a new product, an improved fatty substance, composed of an acidulated derivative of an aromatic base, in which the acid radical contains more than ten atoms of carbon, and paraffin, for substantially the purposes set forth.

In testimony whereof I have signed this specification in the presence of two subscribing witnesses.

OSCAR LIEBREICH.

Witnesses:
  HENRY HASPER,
  WOLDEMAR HAUPT.